United States Patent [19]

Schlapp et al.

[11] Patent Number: 5,020,849
[45] Date of Patent: Jun. 4, 1991

[54] SLIDING-LIFTING ROOF FOR AUTOMOBILES

[75] Inventors: Albert Schlapp, Dreieich; Rainer Grimm, Wetzlar; Horst Böhm, Frankfurt, all of Fed. Rep. of Germany

[73] Assignee: Rockwell-Golde GmbH, Fed. Rep. of Germany

[21] Appl. No.: 486,642

[22] Filed: Feb. 28, 1990

[30] Foreign Application Priority Data

Mar. 16, 1989 [DE] Fed. Rep. of Germany ....... 3908645

[51] Int. Cl.⁵ .............................................. B60J 7/05
[52] U.S. Cl. .................................. 296/221; 296/223; 296/224
[58] Field of Search .......................... 296/213, 221–224

[56] References Cited

U.S. PATENT DOCUMENTS 4,869,548  9/1989  Nagata et al. ....................... 296/221
4,936,622  6/1990  Yamauchi ........................ 296/221 X

FOREIGN PATENT DOCUMENTS 3300308  7/1984  Fed. Rep. of Germany .
0287818  12/1986  Japan .................................. 296/221

Primary Examiner—Dennis H. Pedder

[57] ABSTRACT

A sliding-lifting roof for an automobile of a very low overall height has, in addition to guide links fixed to the side edges of a lid, control links, which are disposed on each side of the lid and each rigidly connect the front sliding element with a guide element, disposed behind the rear sliding element. The sliding elements and the guide element are slidably guided on the same guide rail. A two-armed control lever is disposed on each side of the lid, which lever engages with a central control pin into the control link, engages at its outer end by a guide pin into the guide link and is articulated at its inner end to the rear sliding element. The lid movements are achieved by a sliding drive of the rear sliding element.

10 Claims, 3 Drawing Sheets

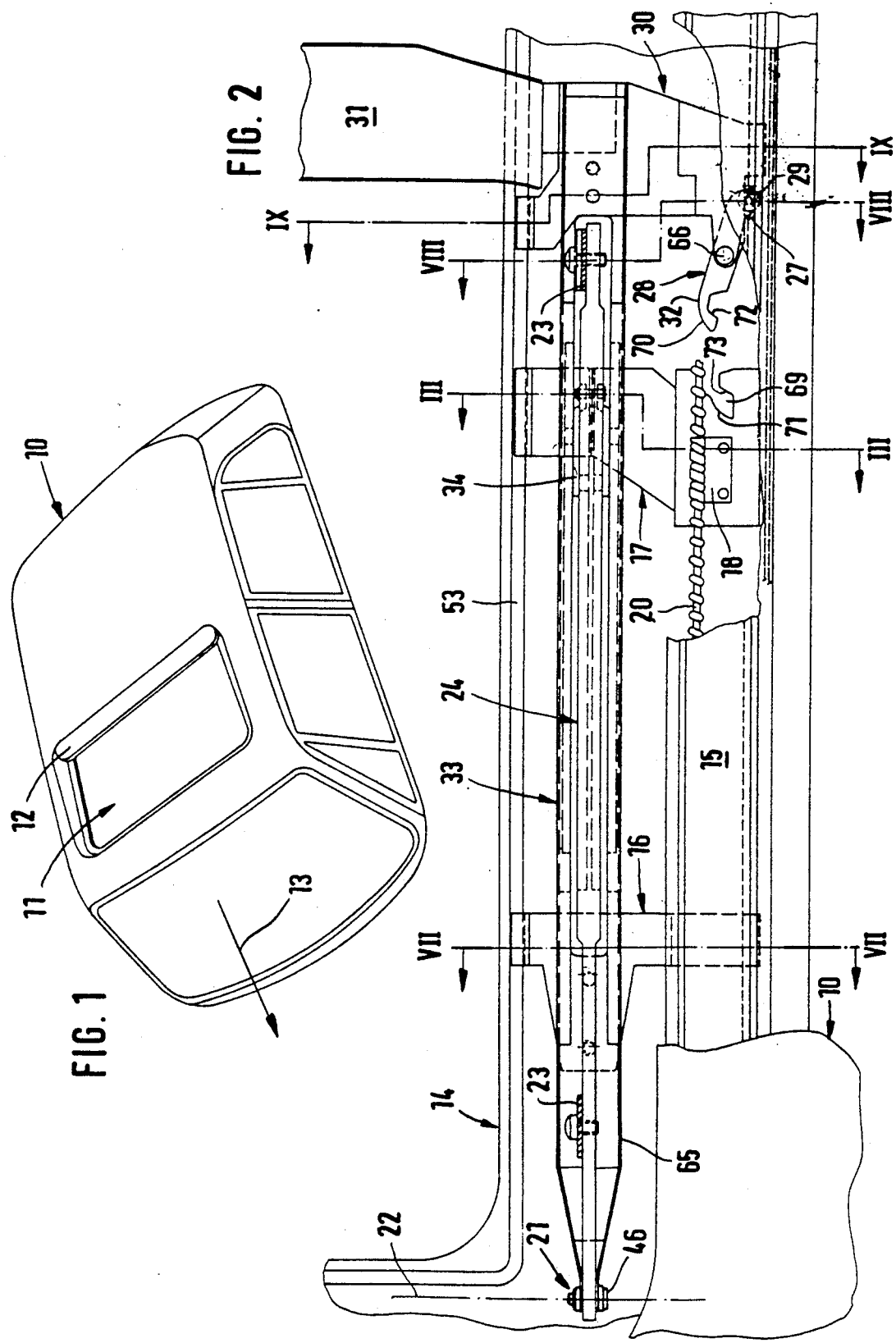

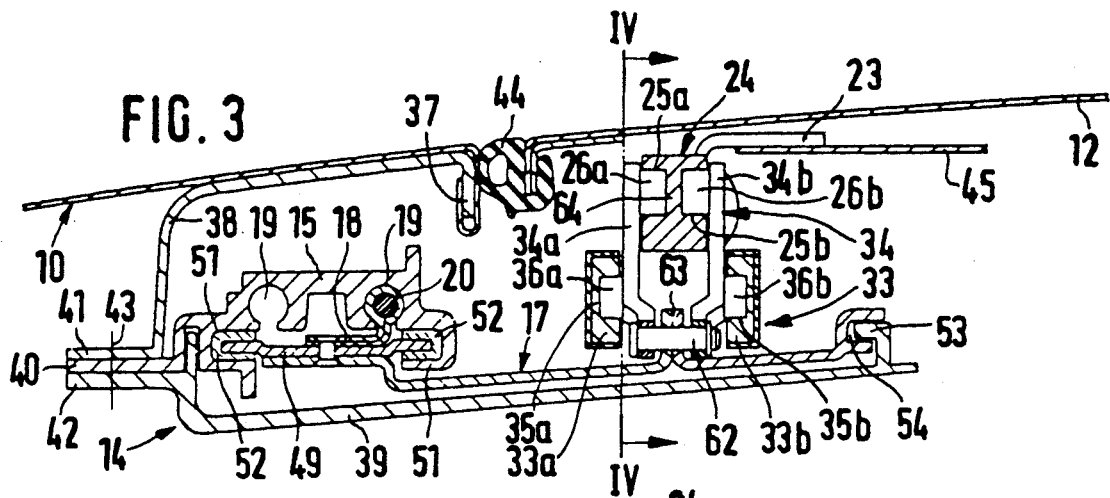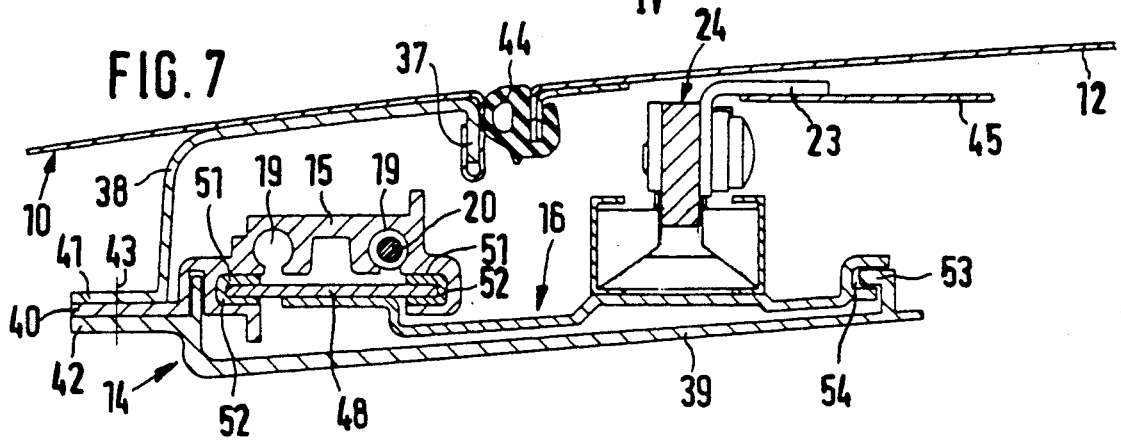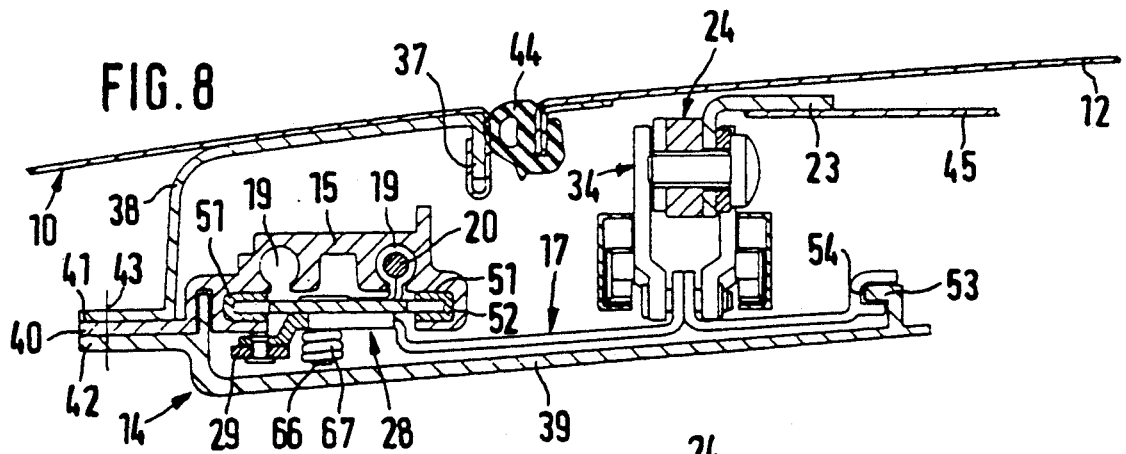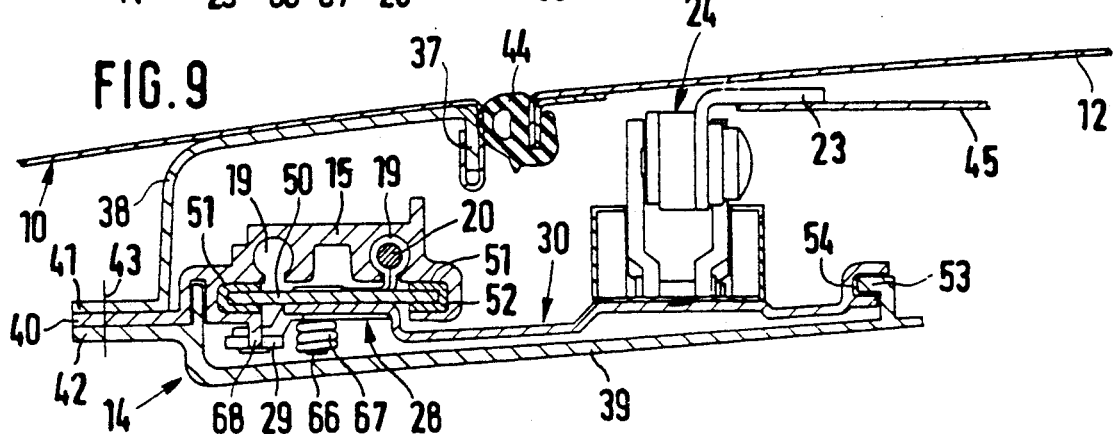

SLIDING-LIFTING ROOF FOR AUTOMOBILES

FIELD OF THE INVENTION

This invention relates to a sliding-lifting roof for automobiles.

DESCRIPTION OF THE PRIOR ART

In a known sliding-lifting roof for an automobile comprises a rigid lid which, for the purpose of displacement relative to a roof opening associated with it, is slidably guided by front and rear sliding elements on guide rails secured laterally to a roof frame, is driven by cables acting in compression-stiff manner on the rear sliding elements and displaceably guided on the guide rails, is pivotally journalled about a horizontal axis extending transversely to the direction of sliding by pivot bearings connected with the front sliding elements, and is equipped along its lateral edges with guide links fixed to it, into which guide pins connected with the rear sliding elements engage, wherein a recess is disposed in each guide rail, opposite each other on both sides of the lid, in the vicinity of the rear edge of the roof opening, into which recess, except when the lid is being slid, there engages a detent element, which is connected with a guide element slidably guided on the guide rail and situated in the region of the rear edge of the lid, wherein furthermore on each side of the lid a coupling element is provided, by which, when the detent element comes out of the recess, the rear sliding element can be positively coupled with the adjacent guide element and by which, when the detent element enters the recess, the rear sliding element can be decoupled from the guide element.

In a known sliding-lifting roof of this type (DE-PS 33 00 308), the parts of the guide slit forming the elongate guide slit of each guide link and controlling, in co-operation with the associated guide pin moving parallel to the guide rails, the lid movements and positions, are so arranged that, between the start and end of the guide slit, a considerable difference in height exists. This is caused, on the one hand, by the relatively steeply, forwardly descending pivot portion starting from the closure portion (lifting function) and, on the other hand, by the rearwardly, steeply rising transition portion, starting from the closure portion and leading to the end portion. This difference in height leads to a guide link with considerable dimensions in height and thus to an undesirably large overall depth of the sliding-lifting roof construction, which interferes with headroom inside the vehicle. This is also contributed to by the circumstance that the guide pin causing the lid movement is so mounted on the rear sliding element that in all positions of the lid it is always above the guide rail and at a considerable distance from it.

It is therefore an object of the present invention to provide a sliding-lifting roof in which the overall height is substantially reduced.

SUMMARY OF THE INVENTION

According to the present invention, there is provided a sliding-lifting roof for an automobile, comprising a rigid lid which, for the purpose of displacement relative to a roof opening associated with it, is slidably guided by front and rear sliding elements on guide rails secured laterally to a roof frame, is driven by cables acting in compression-stiff manner on the rear sliding elements and displaceably guided on the guide rails, is pivotally journalled about a horizontal axis extending transversely to the direction of sliding by pivot bearings connected with the front sliding elements, and is equipped along its lateral edges with guide links fixed to it, into which guide pins connected with the rear sliding elements engage, wherein a recess is disposed in each guide rail, opposite each other on both sides of the lid, in the vicinity of the rear edge of the roof opening, into which recess, except when the lid is being slid, there engages a detent element, which is connected with a guide element slidably guided on the guide rail and situated in the region of the rear edge of the lid, wherein furthermore on each side of the lid a coupling element is provided, by which, when the detent element comes out of the recess, the rear sliding element can be positively coupled with the adjacent guide element and by which, when the detent element enters the recess, the rear sliding element can be decoupled from the guide element; and there being, on each side of the lid, a control link, rigidly connecting the front sliding element with the guide element and the guide pin is mounted on the one end of a two-armed control lever, the other end of which is articulated to the rear sliding element, and a control pin is mounted on the control lever between its two ends, which control pin engages into the control link.

By the present arrangement of a control link on each side of the lid and of an associated control lever which provides the connection between the guide link and the rear sliding element, a much smaller overall height is achieved, the inclined portions of the link guides being divided into two slits having slit portions with opposite directions of slope, namely on the one hand into the guide slit of the guide link and on the other hand into the control slit of the control link. As a result, the transition angles between the individual slit portions of the guide slit and of the control slit can be constructed relatively small, with a direct effect upon the reduced overall height.

The control link and the guide link and the control lever, engaging with both links, may be constructed so that the control slit of the control link possesses a forwardly ascending pivot portion, associated with the lid pivoting movement, while the guide slit of the guide link possesses a pivot portion, associated with the lid pivoting movement, which descends forwardly in known manner when the lid is closed, and the guide slit projects forwardly beyond the control slit, the control lever being disposed ascending forwardly, starting from its pivot bearing on the rear sliding element as far as the guide pin.

The control link can be continued forwards beyond the front sliding element and be connected at its forward end by a pivot bearing pin constituting the lid pivot bearing with the front end of the guide link.

A further reduction in overall height of the sliding-lifting roof construction is obtained by a construction in which, on each side of the lid, the guide link and the control link, on the one hand, and the guide rail, on the other hand, are disposed alongside one another, with the result that the guide pin co-operating with the guide link does not need to be situated above the guide rail in all positions of the lid.

The roof frame can pass beneath both the guide rails and also the guide link and the control link, and the front and rear sliding elements and also the guide elements can extend, as viewed in cross-section, from their guiding engagement with the guide rails to the edge of the roof frame situated inside the roof opening, on which edge they are also slidably guided. This facilitates a tilt-free guidance of the sliding elements and of the guide elements in spite of the arrangement of the links and of the guide rails alongside one another.

The control levers can be each fork-shaped with two lever parts, which are connected to each other at their lower ends by a bearing pin serving for their articulation to the rear sliding element and carry, at approximately their mid-length, control projections aligned with each other and projecting outwards in opposite directions, which control projections together form the control pin, and possess, at their upper ends, guide projections pointing towards and aligned with each other, which together form the guide pin. This provides an especially stable construction of the control levers, which create a firm support for the lid in all positions and all operating conditions. By the fork-like construction of the control levers both the guide links and also the control links may be constructed, in spite of their elongate arrangement of slits, so that these slits do not need to be formed continuously throughout the link bodies, with the result that the guide links and the control links can also accept considerable forces transversely to the directions of the slits, without any widening of the slits. This can be achieved by providing that the guide links are each disposed between the lever parts of the control lever and possess two mirror-image, laterally open halves of the guide slit, which are separated from each other by a stiffening wall and into which the guide projections engage, and that the control links are each divided into two opposite, spaced-apart halves, between which the control lever is situated and which comprise mirror-image halves of the control slit, into which the control projections engage.

The halves of the control link can be fixed to a link beam, which in turn is fixed to the front sliding element and the guide element, and through the front end of which the pivot bearing pin passes. The construction and provision of a link beam for the control links makes possible a very stable and bending-resistant connection between the front sliding elements and the guide elements, wherein it is not necessary to take special account of the choice of material for the control links constituting the control sits, from the stability aspect.

The two-armed lever carrying the detent element and the coupling element can be pivotally mounted in a generally horizontal plane, so that the lever provided at each side of the lid and the elements co-operating with it require only small overall height, in contrast to a lever pivotally journalled in a vertical plane (DE-PS 33 00 308).

With advantage, the arrangement of the coupling elements active between the rear sliding elements and the guide elements can be such that there is associated with the conventionally hook-shaped coupling element, a correspondingly shaped coupling recess in the rear sliding element, mutually co-operating guide surfaces being provided on the coupling element and in the coupling recess for the disengagement pivoting of the two-armed lever and mutually co-operating coupling surfaces being provided for the force-transmitting entrainment of the guide element during the closure sliding of the rear sliding element.

BRIEF DESCRIPTION OF THE DRAWINGS

For a better understanding of the invention and to show how the same may be carried into effect, reference will now be made, by way of example, to the accompanying drawings, in which:

FIG. 1 is a perspective view of a passenger car roof with a sliding-lifting roof mounted thereon, the lid of which is shown slid open, FIG. 2 is a partial, partly cut-away plan of the left side (relative to the travel direction) of the sliding-lifting roof construction, which unlike the remaining illustrations has the lid omitted, FIG. 3 is a cross-section taken on the line III—III in FIG. 2, FIG. 4 (is a longitudinal section along the line IV—IV in FIG. 3, with lid closed, FIG. 5 is a longitudinal section corresponding to FIG. 4, but with lid raised into a ventilation position, FIG. 6 is a longitudinal section corresponding to FIG. 4, but with the lid lowered before commencement of the opening displacement, FIG. 7 is a cross-section corresponding to line VII—VII in FIG. 2.

FIG. 8 is a cross-section corresponding to the section line VIII—VIII in FIG. 2, and FIG. 9 is a cross-section taken along the line IX—IX in FIG. 2.

Figure 4:
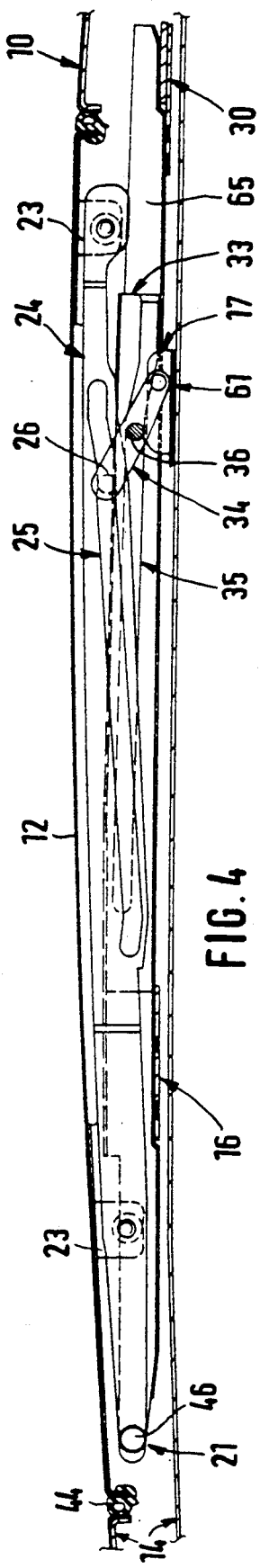
Figure 5:
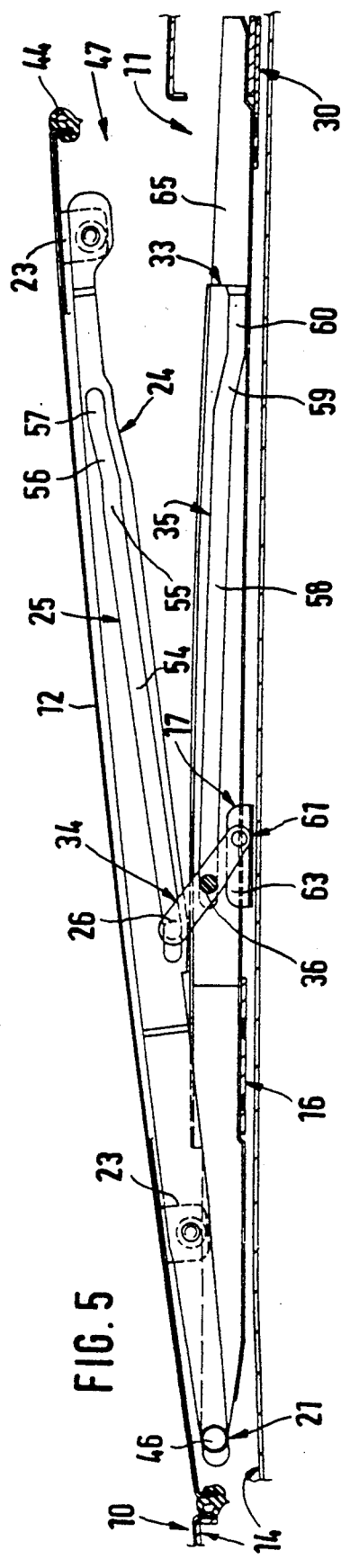
Figure 6:
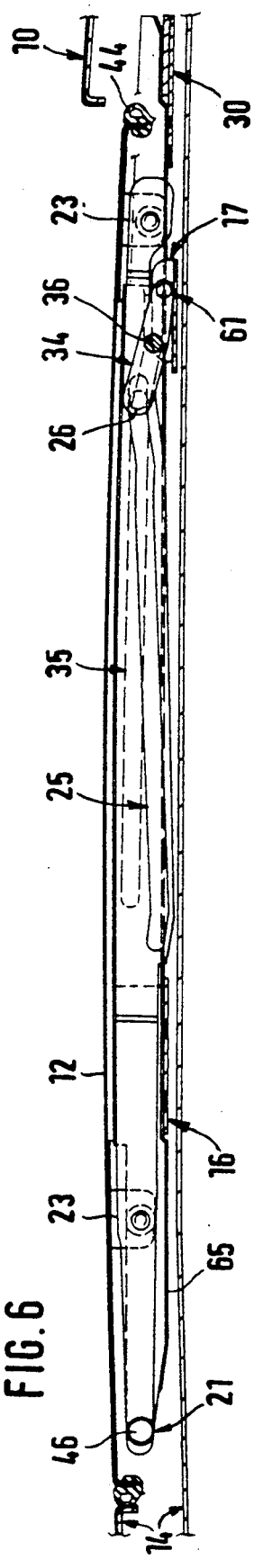

The longitudinal sectional views shown in FIGS. 4 to 6 are to a smaller scale than the similar cross-sectional views shown in FIGS. 3 and 7 to 9 and the plan of FIG. 2.

DESCRIPTION OF THE PREFERRED EMBODIMENT

The passenger car or automobile roof 10 illustrated in FIG. 1 possesses, in its forward region, a roof opening 11, which can be closed by a rigid lid 12, associated with it. The forward direction of travel of the vehicle is indicated by arrow 13. The localizing statements "front, rear, left and right" each relate to the direction of forward travel according to the arrow 13. The sliding-lifting roof construction can be constructed substantially as a mirror-image in respect of its left and right sides, so that the left side illustrated in FIGS. 2 to 9 will be described below, because the right side is correspondingly constructed.

As can be seen from the plan of FIG. 2 and the various cross-sectional and longitudinal sectional views, the sliding-lifting roof comprises basically the following assemblies and elements: a roof frame, referenced generally 14, a guide rail 15 fixed thereto, a front sliding element 16 displaceably guided on the guide rail, a rear sliding element 17 likewise displaceably guided on the guide rail, a cable 20 having a helical thread and guided compression-stiff in one of the two guide channels 19 of the guide rail 15 and attached by an entraining device 18 to the rear sliding element 17, into which cable a toothed pinion (not shown), driven by a hand crank or electric motor in the front region of the roof frame 14, engages, a pivot bearing 21 connected with the front sliding element 16, which pivot bearing constitutes a horizontal pivot axis 22 for the lid 12, extending transversely to the sliding direction of the lid 12, a guide link 24, fixed to the lid 12 along the lateral edge of the lid 12 by a front and a rear fixing angle 23, a guide pin 26 engaging into a guide slit 25 of the guide link 24, a recess 27, formed in the guide rail 15 in the vicinity of the rear edge of the roof opening for a detent element 29 formed on a two-armed lever 28, a guide element 30, displaceably guided on the guide rail in the region of the rear edge of the lid 12 and journalling the two-armed lever 28, a water deflector plate 31 fixed to the guide element and engaging beneath the rear edge gap when the lid is closed, a coupling element 32 formed in addition to the detent element 29 on the two-armed lever 28, which coupling element can be positively coupled with and decoupled from the adjacent, rear sliding element 17 in a manner to be described, a control link referenced generally 33, a two-armed control lever 34, and a control pin 36 mounted on the control lever 34 and engaging into a control slit 35 of the control link 33. The aforementioned listed assemblies and elements of the sliding-lifting roof are explained in greater detail below.

To form the roof opening 11, the sheet metal material of the automobile roof 10 is bent downwards at right angles on all four sides of the roof opening and, at front and left and right, is wrapped with a beading edge around a vertical downward flange 37 of a mounting frame 38 fixed to the automobile roof 10. The mounting frame 38 and a guide frame 39 together form the roof frame 14. The guide rail 15, situated underneath the vehicle roof 10, is inserted with a lateral flange 40 between corresponding side flanges 41 and 42 of the mounting frame 38 and guide frame 39 respectively and bolted to them at 43. The lid 12 is, in the present example, a sheet metal lid, but could also be made as a glass lid. Onto its flange, orientated downwards and present on all four sides, an edge gap sealing profile 44 is pushed on, which when the lid is closed (FIGS. 3 and 4 and 7 to 9) bears sealingly against the vertical downward flange of the automobile roof sheet. Water which nevertheless may penetrate through the edge gap is collected by the generally channel-shaped guide frame 39 and conducted away by the water deflectors (not shown) adjoining thereto. The lid 12 is provided, on its lower side, with a lid reinforcement 45, to which the fixing angles 23 for the guide link 24 are fixed.

As FIGS. 2 and 4 to 6 show, the control link 33 is continued forwards beyond the front sliding element 16 and is connected at its front end to the front end of the guide link 24 by a pivot bearing pin 46 constituting the lid pivot bearing 21. From FIG. 5 the maximum pivoted-out position of the lid 12 can be seen, in which the lid has been pivoted upwards about the pivot bearing pin 46 to form a ventilation gap 47 between the rear edge of the lid 12 and the rear edge of the roof opening 11. As FIG. 3, for example, shows, the guide link 24 and the control link 33 are situated laterally alongside the guide rail 15 and beneath the lid 12.

As FIGS. 3 and 7 to 9 furthermore illustrate, the front sliding element 16, the rear sliding element 17 and the guide element 30 are slidably guided, all in the same manner, by a respective guide plate 48, 49 and 50 connected to each of them, in mutually facing guide tracks 51 of the guide rail 15 with the intermediary of sliding shoes 52 of low-friction material. In addition to this guiding engagement with the guide rails 15, the front sliding element 16, the rear sliding element 17 and the guide element 30 are each slidably guided by a groove 54 to prevent tilt on an edge 53 of the guide frame 39, situated inside the roof opening 11.

The form of construction of the guide link 24 and control link 33 will not be described in more detail with reference to FIGS. 4 to 6. As can be seen especially from FIG. 5, the guide slit 25 of the guide link 24 is composed essentially of a pivoting portion 54, a closure position portion 55, a transition portion 56 and an end portion 57. Viewed with the lid 12 closed (FIG. 4) the pivoting portion 54 associated with the lid pivotal movement slopes down from rear to front. The transition portion 56, which is associated with the lowering movement of the rear edge of the lid, ascends in contrast from front to rear. At the end of the lowering movement and during the closure and opening displacements of the lid 12, the guide pin 26 is situated in the end portion 57.

The control slit 35 of the control link 33 possesses, in contrast, a pivoting portion 58 ascending from rear to front and associated with the lid pivoting movement, and a transition portion 59, associated with the lid lowering movement starting from the lid closed position, this portion 59 descending front to rear, as can also be best seen from FIG. 5. The rearwardly open portion 60, adjoining the transition portion 59, serves for assembling the sliding-lifting roof. As can be seen from the drawings, the guide slit 25 extends forwards beyond the control slit 35, which corresponds to the alignment of the control lever 34, which is always disposed ascending forwards in all positions of the lid, starting from its pivot bearing 61 on the rear sliding element 17 to the guide pin 26. In the example of embodiment shown, the guide link 24, the control link 33 and the control lever 34 are each in a particular manner formed double-sided, as will be described below with reference especially to FIGS. 3 and 5. The control lever 34 is formed fork-shaped of two lever parts 34a and 34b, which are connected together at their lower end by a pivot pin 62. The pivot pin 62 passes through an upward flange 63 of the rear sliding element 17, composed of two parts. In this way, the pivot bearing 61 is formed. Approximately at mid-length of the lever parts 34a and 34b, control projections 36a and 36b, which together constitute the control pin 36, are fixed, mutually aligned with each other and pointing outwards in opposite directions. At their upper ends, the lever parts 34a and 34b possess guide projections 26a and 26b, which together form the guide pin 26, these projections being aligned with each other and pointing towards each other.

The guide link 24 is disposed between the lever parts 34a and 34b of the control lever and comprises two mirror-image, laterally open halves 25a and 25b of the guide slit 25, which are separated from each other by a stiffening wall 64. The guide projections 26a and 26b engage slidably, each into the adjacent half 25a, 25b respectively of the guide slit 25. The control link 33 is divided into two halves 33a and 33b, spaced opposite each other at a distance, between which the control lever 34 is situated. The halves 33a and 33b of the control link 33 comprise mirror-inverted halves 35a and 35b of the control slit 35, into which the control projections 36a and 36b respectively slidably engage. The halves 33a and 33b of the control link 33 are fixed to an elongate link beam 65, which fits around these halves of the control link above and below, thus preventing transverse widening-out of the control slit halves 35a and 35b under the action of forces orientated transversely to the control link 33. The link beam 65 forms the rigid connection between the front sliding element 16 and the guide element 30, to both of which it is fixed. The pivot bearing pin 46 passes through the forward, tapered end (FIG. 2) of the link beam 65.

The coupling device active between the rear sliding element 17 and the adjacent guide element 30 is now described in detail with reference to FIGS. 2, 8 and 9. The two-armed lever 28, which carries at one end the hook-shaped coupling element 32 and at its other end the detent element 29, formed as a roller, is pivotally journalled on a vertically orientated pin 66, and is prestressed by a helical torsion spring 67 in the clockwise direction, i.e. in the sense of engagement of the detent element 29 into the recess 27 of the guide rail 15. The recess 27 is situated in a perpendicular flange 68 of the guide rail 15, along which flange the roller-like detent element 29 rolls during displacements of the lid 12, when the lid is not in its forward, engaged position, illustrated in FIGS. 2, 8 and 9.

For the hook-like coupling element 32, a correspondingly shaped coupling recess 69 is provided in the rear sliding element 17. On the coupling element 32 and the coupling recess 69, co-operating guide surfaces 70, 71 respectively are provided, which slide on one another during the disengagement pivoting of the two-armed lever 28. Furthermore, mutually co-operating coupling surfaces 72, 73 respectively are provided on the coupling element 32 and the coupling recess 69, which surfaces serve for the force-transmitting entrainment of the guide element 30 during the closure displacement of the rear sliding element 17.

The method of functioning of the sliding-lifting roof is now briefly described starting from the closed position of the functional components illustrated in FIG. 2. If the lid is to be raised out of its closed position according to FIG. 4 into an upwardly outwardly pivoted position, the cable 20 is displaced forwards by the drive device (not illustrated) force-transmittingly connected to it, and at the same time entrains the rear sliding element 17. Since the detent element 29 is now engaged into the recess 27, the guide element 30, control link 33 and front sliding element 16 remain stationary. The upward pivotal movement of the lid 12 commences immediately after the guide pin 26 has left the closure position portion 55 and entered the pivoting portion 54 of the guide slit 25. In the pivoting movement, the guide pin 26 moves in the pivoting portion 54 of the guide slit 25 forwards, while at the same time the control pin 36 moves forwards in the pivoting portion 58 of the control slit 35. In this way the lid 12 is smoothly upwardly pivoted. In the pivoting-in again of the raised lid 12, the movement sequence starting from FIG. 5 continues in the reverse direction until the positions of the functional parts shown in FIGS. 2 and 4 are reached.

If, in contrast, the closed lid, starting from the positions of the functional parts according to FIGS. 2 and 4, is to be slid open, then the cable 20 is driven towards the rear, the guide pin 26 sliding rearwards in the transition portion 56 of the guide slit 25, while at the same time the control pin 36 slides towards the rear in the transition portion 59 of the control slit 35. In this movement, the control lever 34 pivots counter-clockwise about its pivot bearing 61. The lowering movement is completed when the guide pin 26 reaches the end portion 57 of the guide slit 25. The control pin 36 is now at the end of the transition portion 59 of the control slit 35. When the lowered lid position (FIG. 6) is approached, the guide surface 70 of the coupling element 32 meets the guide surface 71 of the coupling recess 69. As a consequence, the two-armed lever pivots gradually counter-clockwise against the force of the helical torsion spring 67 until the detent element 29 has emerged from the recess 27. The coupling element 32 is finally completely in the coupling recess 69. If the movement towards the right of the cable 20 is now continued, entraining the rear sliding element 17, then the guide element 30 is entrained in the direction of the opening displacement.

All the parts of the sliding-lifting roof construction, including of course the lid 12, which are connected with the guide element 30 participate in the opening displacement movement The roller-like detent element 29 rolls along the flange 68. If, in contrast, the lid 12 is to be moved out of its said-open position forwards towards its closure position, the sequence of movement takes place in the reverse sense. Since the two-armed lever 28, as a consequence of the bearing of the detent element 29 against the flange 68, cannot now pivot, the coupling element 32 remains in the coupling recess 69, so that the guide element 30 and all parts connected to it are entrained forwards by the engagement of the coupling surfaces 72 and 73, until the detent element 29 can again enter the recess 27, thus causing the coupling engagement between the coupling element 32 and the coupling recess 69 to be cancelled. The lid 12 has now arrived in its forward position, but still requires to be raised out of its lowered position, illustrated in FIG. 6. This raising operation can be directly brought about by further movement of the cable 20 in the forward direction, the guide pin 26 finally leaving the transition portion 56 and entering the closure position portion 55 of the guide slit 25, while the control pin 36 leaves the transition portion 59 of the control slit 35 or reaches the forward end of the transition portion 59.

We claim:
1. A sliding-lifting roof for an automobile having a roof opening comprising:
   a rigid lid mounted for movement relative to said roof opening,
   a guide rail secured laterally to a roof frame at each side of said roof opening,
   a front and a rear sliding element slidably guided by said guide rails at each side of said roof opening,
   a cable acting in compression-stiff manner on each of said rear sliding elements and displaceably guided on said guide rails,
   a pivot bearing connected with each of said front sliding elements and pivotally journalling said rigid lid for movement about a horizontal axis extending transverse to a direction of sliding movement of said lid,
   a guide link fixed at each side of said lid, each of said guide links having a guide slit,
   a guide pin carried by each of said rear sliding elements and engaging one of said guide slits in one of said guide links,
   a recess in each of said guide rails, each of said recesses being opposite the other recess in the vicinity of a rear edge of the roof opening,
   a guide element slidably guided on the guide rail adjacent a rear edge of the rigid lid,
   a detent element connected to said guide element at each side of said lid, each of said detent elements engaging one of said recesses when said rigid lid is not being slidably displaced relative to said roof opening,
   a coupling element connected to said detent element and operative to couple each of said rear sliding elements to said guide element when said detent elements are disengaged from said recesses and to decouple the rear sliding element from said guide element when said detent elements are engaged in said recesses, a control link on each side of said lid and rigidly connecting the front sliding element with the guide element, a two-armed control lever at each side of said rigid lid, each of said guide pins mounted at one end of one of said control levers, means mounting the other end of each of said control levers for articulating movement relative to one of said rear sliding elements, and a control pin mounted on each control lever between the two ends thereof and engaging one of said control links.

2. A sliding-lifting roof according to claim 1, wherein each control link includes a slit having a forwardly ascending pivot portion associated with pivoting movement of the lid, the guide slits of the guide links include a pivot portion associated with pivoting movement of the lid which descends forwardly when the lid is closed, the guide slits project forwardly beyond the control slits, and the control levers are disposed ascending forwardly, starting from said means mounting the other end comprising a pivot bearing mounting the control levers to the rear sliding elements to the guide pins.

3. A sliding-lifting roof according to claim 1 wherein said control links extend forward beyond the front sliding elements and are connected at their forward ends with the front ends of the guide links by a pivot bearing pin constituting the lid pivot bearing.

4. A sliding-lifting roof according to claim 1 wherein the guide-links and the control links on the one hand and the guide rails on the other hand are disposed adjacent each other as viewed in cross-section, the guide links and the control links being disposed underneath the lid, and the guide rails are disposed outside the roof opening under the fixed roof surface of the automobile.

5. A sliding-lifting roof according to claim 1, wherein the roof frame extends beneath the guide rails, the guide links, the control links and the front and rear sliding elements, the sliding elements extend, as viewed in cross-section, from their guiding engagement with the guide rails to an edge of the roof frame situated inside the roof opening and are also slidably guided on said edge of the roof frame.

6. A sliding-lifting roof according to claim 1, wherein the control levers are each fork-shaped to form two lever parts which are connected to each other at their lower ends by said means mounting the other end of the control levers comprising a bearing pin providing articulation relative to the rear sliding element, control projections aligned with each other and projecting outwards in opposite directions are provided approximately at the mid-length of said lever parts, which control projections together form said control pin, and guide projections pointing towards and aligned with each other are provided at an upper end of said control lever and cooperate together to form said guide pin.

7. A sliding-lifting roof according to claim 6, wherein the guide links are each disposed between the lever parts of one of said control levers and comprise two mirror-image, laterally open halves providing said guide slit, said laterally open halves are separated from each other by a stiffening wall and engage the guide projections forming said guide pin, and the control links are each divided into two opposite, spaced-apart halves, between which one of said control levers is actuated and which comprise mirror-image halves providing a control slit which engages the control projections forming said control pin.

8. A sliding-lifting roof according to claim 7, wherein the halves of the control link are fixed to a link beam, which in turn is fixed to the front sliding element and the guide element, and said pivot bearing being a pivot bearing pin which passes through the front end of the link beam.

9. A sliding-lifting roof according to claim 1, wherein a two-armed lever is pivotally journalled on the guide element at each side of said lid, said lever is arranged to pivot in an approximately horizontal plane, a detent element is provided at one end of each lever, a coupling element is provided at the other end of each lever, and a recess is provided in a perpendicular flange of each guide rail for engagement with one of said detent elements.

10. A sliding-lifting roof according to claim 9, wherein said coupling element is hook-shaped, a correspondingly shaped coupling recess is provided in an adjacent rear sliding element, and mutually co-operating guide surfaces are provided on the coupling element and in the coupling recess for the pivoting disengagement of the two-armed lever and mutually co-operating coupling surfaces are provided for the force-transmitting entrainment of the guide element by the hook-shaped coupling element during sliding movement of the rear sliding element to close said opening.

* * * * *